United States Patent [19]

Hoggard

[11] 4,043,020

[45] Aug. 23, 1977

[54] ARROWHEAD EXTRACTOR

[75] Inventor: Anthony J. Hoggard, Merrill, Mich.

[73] Assignee: Tomar Corporation, Indian River, Mich.

[21] Appl. No.: 705,764

[22] Filed: July 16, 1976

[51] Int. Cl.2 .............................................. B23P 19/02

[52] U.S. Cl. ...................................... 29/427; 29/254; 173/91; 273/106.5 R

[58] Field of Search ..................... 29/426, 427, 200 H, 29/203 H, 203 HM, 242, 243, 244, 254, 255, 282, 283; 273/106.5 R, 106.5 A, 106.5 B, 106.5 C, 106.5 D; 16/110 R; 173/126, 91

[56] References Cited

U.S. PATENT DOCUMENTS

| | | | |
|---|---|---|---|
| 2,572,370 | 10/1951 | Moeller | 81/1 X |
| 2,903,932 | 9/1959 | McGonagill | 173/126 X |
| 2,934,984 | 5/1960 | Woodman | 173/91 X |
| 3,529,497 | 9/1970 | Brooks | 29/254 X |
| 3,750,500 | 8/1973 | Peterson | 81/52.35 |
| 3,890,692 | 6/1975 | Jandura | 29/427 |

*Primary Examiner*—James R. Duzan

*Attorney, Agent, or Firm*—Ian C. McLeod

[57] ABSTRACT

A novel tool and method for extracting arrowheads from stumps, trees and the like using a linearly slideable housing or hammer mounted on a shaft which is attached to the arrowhead is described. In particular, the tool is provided with a retaining means to hold the shaft in the housing to prevent accidental movement and thus noise in use in the field. The tool preferably has a round shaft which is rotatable in an extended position in the housing which facilitates arrowhead extraction during linear movement and which in its retracted position in the housing engages a locking means which holds the shaft from rotational movement to permit threading of the shaft onto and off from the arrowhead by rotating the housing.

5 Claims, 11 Drawing Figures

ARROWHEAD EXTRACTOR

SUMMARY OF INVENTION

The present invention relates to an arrowhead extractor and the method for its use. In particular, the present invention relates to an arrowhead extractor which utilizes for the extraction a linearly slidable hammer or housing mounted on a shaft attached to the arrowhead.

In hunting using a bow and arrow, a major problem is that the hunting arrowheads become deeply embedded in trees, stumps and the like and are very difficult to remove. In recent times, the arrowheads, such as the broad point type shown in U.S. Pat. No. 3,401,938, have been made so that the arrow shaft can be removed without damage from the embedded arrowhead. Pulling tools such as shown in U.S. Pat. No. 3,890,692 are suitable only for target arrowheads which are easily extracted by pulling without being bent. In current practice, the hunter then uses a pair of pliers and/or a knife to extract the hunting arrowheads which have razor sharp edges. As is well known, the hunter runs a considerable risk of being cut by the sharp edges and the arrowheads become bent during the extraction. Even when the arrowhead is of the round head target type, if it becomes embedded in an object it can be very difficult and time consuming to remove.

OBJECT

It is therefore an object of the present invention to provide a hand operated tool which can rapidly and easily extract an arrowhead from a tree, stump or the like. It is further an object of the present invention to provide a method for such arrowhead extraction. These and other objects will become increasingly apparent by reference to the following description and the drawings.

IN THE DRAWINGS

Figure 4:
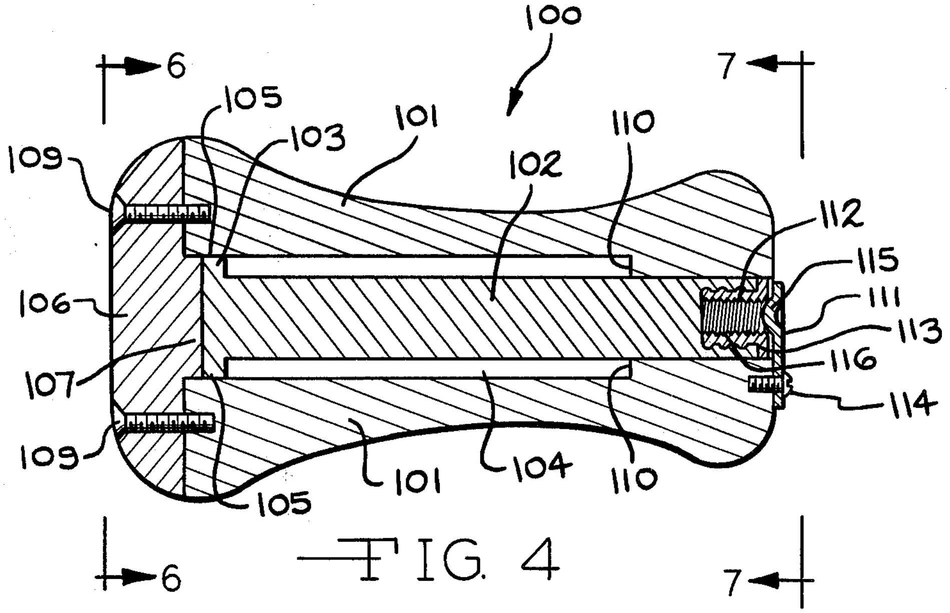
FIGS. 4 and 5 show front cross-sectional views of preferred embodiment tool with the shaft retracted and extended, respectively.
Figure 6:
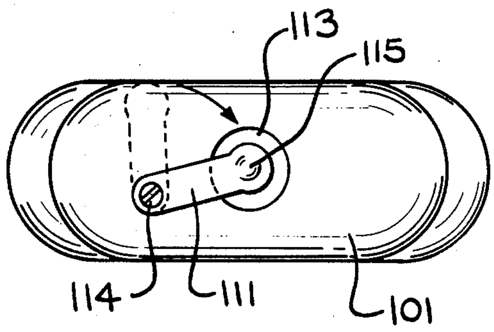
Figure 7:
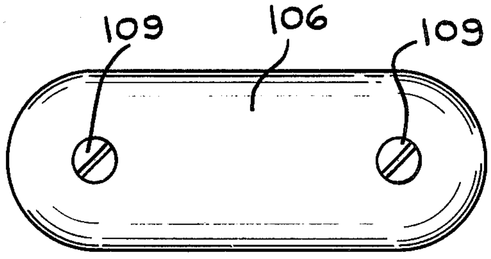
Figure 5:
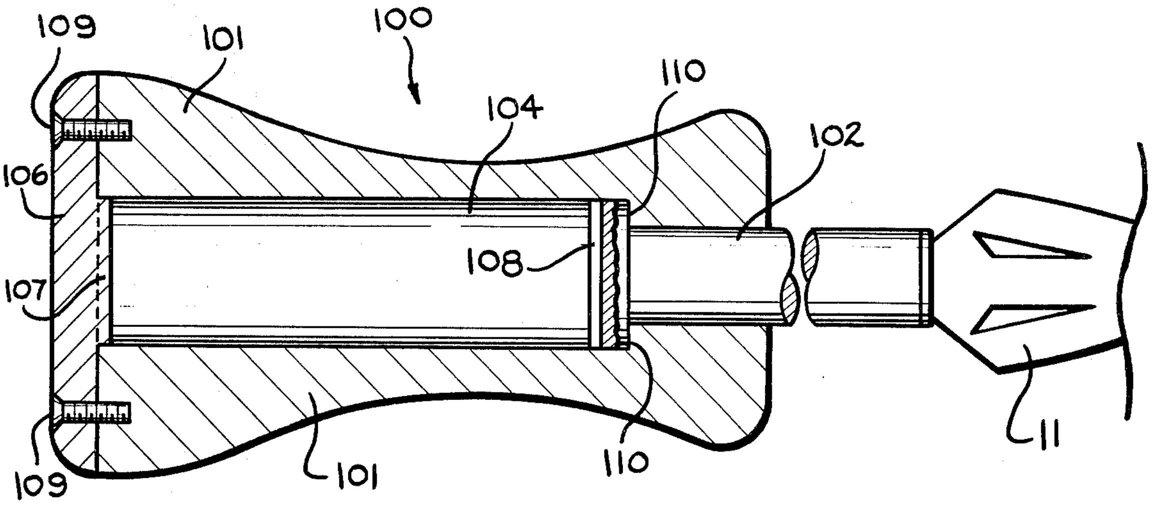

FIGS. 6 and 7 show end views of the tool shown in FIG. 4 along lines 6—6 and 7—7, respectively, with the dotted lines in FIG. 6 illustrating the open positioning of a shaft locking cap.

Figure 8:
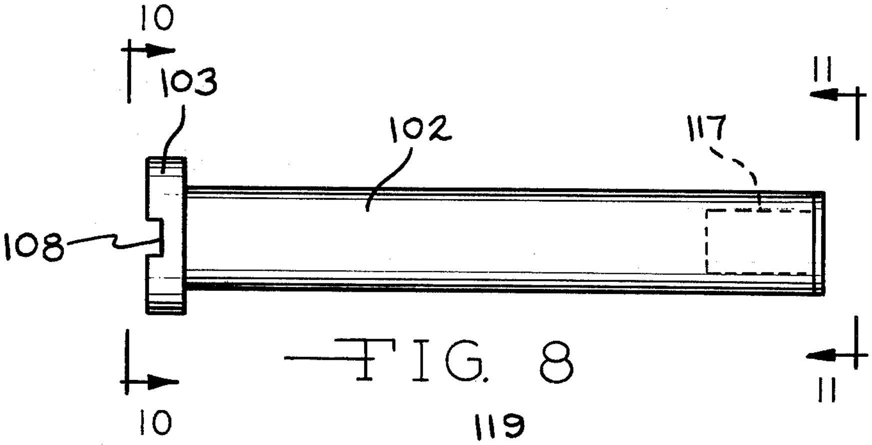

FIG. 8 is a front view illustrating the shaft shown in cross-section in FIGS. 4 and 5 and FIGS. 10 and 11 are end views taken along lines 10—10 and 11—11 of FIG. 8.

Figure 9:
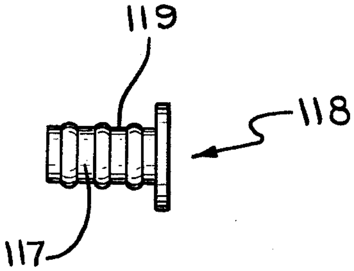
Figure 10:
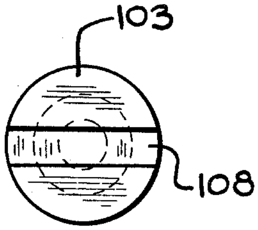
Figure 11:
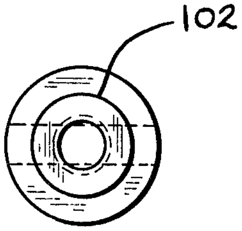

FIG. 9 is a front view of the insert with a threaded hole which is mounted in the shaft shown in FIG. 8.

GENERAL DESCRIPTION

Figure 1:
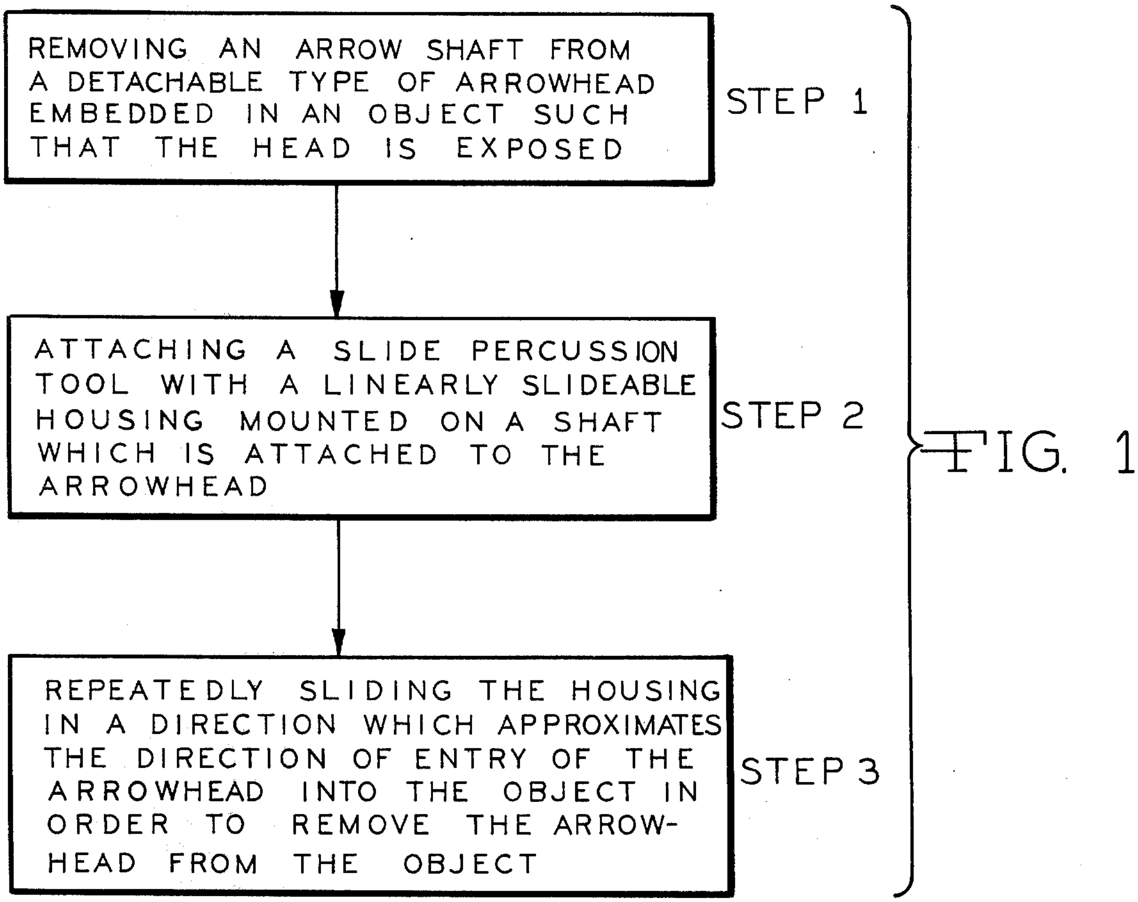
FIG. 1 is a diagram describing the steps of the method of the present invention.

The present invention relates to the tool adapted for the extraction of arrowheads from stumps, trees and the like which comprises: (a) a shaft having a longitudinal axis and having one end adapted for attachment with an arrowhead; (b) a flange provided on said shaft so that there is an elongate portion of the shaft between the end for arrowhead attachment and the flange; (c) a housing member mounted on the shaft and adapted to be gripped by the hand having a central passage adapted for sliding engagement with the shaft and having an abutment at the end of the passage for hammering engagement with the flange when the shaft is pulled from the housing, and (d) retaining means provided on the housing for selectively contacting and holding the shaft in a fixed position relative to the housing. It also relates to the preferred tool adapted for the extraction of arrowheads which comprises: (a) a round shaft having a longitudinal axis and having one end adapted for attachment with an arrowhead; (b) a flange provided on said shaft so that there is an elongate portion of the shaft between the end for arrowhead attachment and the flange; (c) a housing member mounted on the shaft and adapted to be gripped by the hand with a central passage adapted for sliding and rotational engagement with the shaft and having an abutment at one end of the passage for hammering engagement with the flange when the shaft is pulled from the housing; and (d) locking means on the housing which selectively holds the shaft from rotational movement in the housing. Further still the present invention relates to the method for extracting an arrowhead which comprises: (a) removing an arrow shaft from a detachable type of arrowhead embedded in an object such that the head is exposed; (b) attaching a slide percussion tool with a linearly slideable housing mounted on a shaft with a percussion stop to the arrowhead; and (c) repeatedly sliding the housing in a direction which approximates the direction of entry of the arrowhead into the object in order to remove the arrowhead from the object by hammering the housing against the stop. FIG. 1 describes these steps.

The prior art has provided slide percussion tools for pushing or pulling nails, bolts and the like and U.S. Pat. No. 2,572,370 describes such a tool. In this tool, a housing slides on a shaft and a portion of the housing engages a flange on the shaft to provide a hammering effect. The common characteristic of such tools is that the housing is allowed to slide freely along the axis of the shaft since there has been no need to prevent noise when the tool is carried. Also the prior art tools sometimes have a potential exposed hand pinch point between the slide and the hammer. The method and tool of the present invention utilizes the slide percussion effect of such prior art tools attached to an arrowhead in a manner specifically adapted for hunting with a bow and arrow by providing retaining means on the tool for selectively holding the shaft and housing in a fixed position.

SPECIFIC DESCRIPTION

Figure 2:
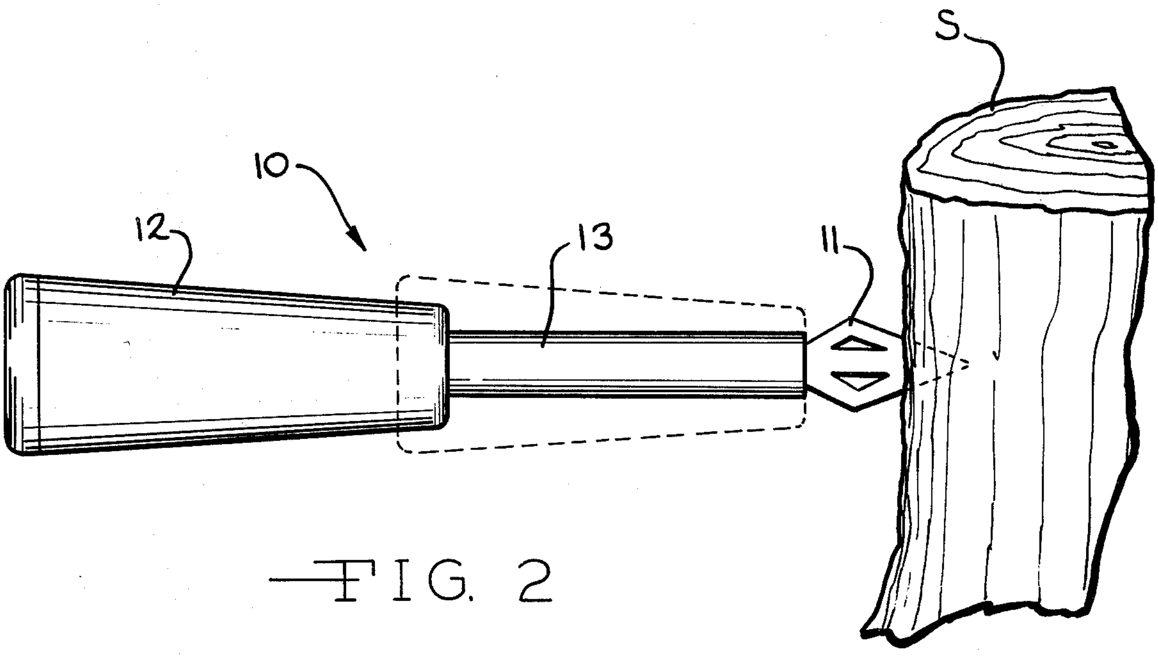
FIG. 2 is a front view of an extraction tool attached to an arrowhead in a stump or tree in its extended position and showing in dotted lines the retracted position.

Referring to FIG. 2, one preferred version of a tool 10 is illustrated which is attached to a broad point arrowhead 11 deeply embedded in a stump S. The tool 10 includes a housing or hammer 12 which is linearly slideable on a shaft 13 attached to the arrowhead 11. The dotted lines illustrate the housing 12 with the shaft 13 retracted inside. As can be seen, there is no available hand pinch point in tool 10.

Figure 3:
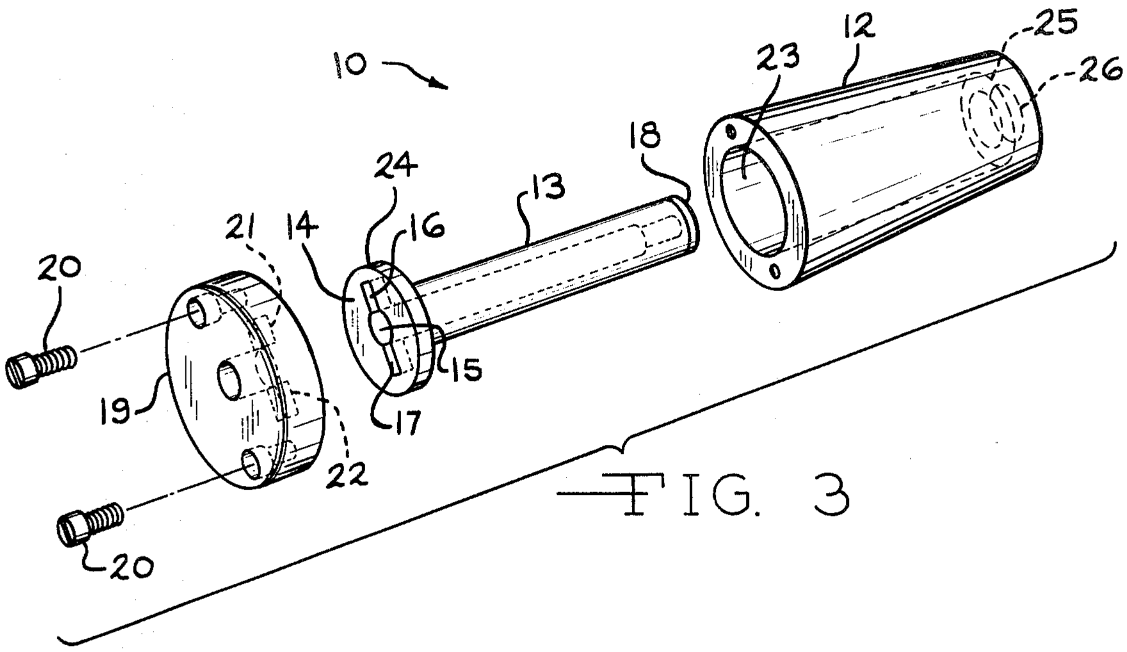
FIG. 3 is a disassembled projection view of the tool shown in FIG. 2 and particularly illustrating locking lugs on a cap at one end of a housing which engage corresponding recesses in a flange at the end of the shaft.

The assembly of the tool 10 can be seen from FIG. 3 wherein the component parts are shown disassembled. The shaft 13 which is round includes a round or circular flange 14 integrally formed at one end. The center or longitudinal axis of the shaft 13 and flange 134 are provided with a hole 15 for weight reduction. Recesses 16 and 17 are provided in the flange 14 adjacent the opening to the hole 15. At the opposite end of the shaft 13, a threaded hole 18 is provided for attachment to the arrowhead 11. The housing 12 is fitted with a removable cap 19 which is attached by means of screws 20 to the housing 12. The cap 19 is provided with integral lugs 21 and 22 which fit into the recesses 16 and 17 when the shaft 13 is retracted into the housing 12. The housing 12 has a uniform diameter hole 23 adapted to engage the circular ridge 24 of the flange 19, which extends almost completely through the housing to an integral shoulder or abutment 25. Along the same axis as the hole 23 a smaller hole 26 is provided which is in sliding engagement with the sides of the shaft 13.

As can be seen from FIGS. 2 and 3, the tool 10 is secured to the arrowhead 11 by rotating the housing 12 and shaft 13 together by engaging the lugs 21 and 22 in the recesses 16 and 17. In practice the shaft 13 is rotated with one hand while holding the housing 12 with the other hand which loosely fits it onto mating threads of the arrowhead 11. The final tightening is by means of engaging the lugs 21 and 22 in the recesses 16 and 17. The housing 12 is then hammered outward on the shaft 13 with the flange 14 hammering on the abutment 25 to progressively extract the arrowhead 11 from the stump S. The flange 14 repeatedly engages the abutment 25 during this procedure. The lugs 21 and 22 are then used to loosen the shaft 13 from the arrowhead 11 usually by using a loose fit of the arrowhead 11 in the hole from which the arrowhead 11 was extracted and then removed by hand and reapplied to the arrow shaft (not shown). A suitable recess (not shown) can be provided in the tool 10 for retightening of the arrowhead 11 onto the arrow shaft.

FIGS. 4 to 11 illustrate a preferred embodiment of the tool 10 shown in FIGS. 2 and 3. in this tool 100, an hour glass or "dog bone" shaped housing 101, preferably with parallel truncated sides, is used to provide ease of gripping with the hand. A round shaft 102 with a round flange 103 is fitted into a hole 104 in the housing 101 such that the sides 105 of the flange 103 are in shaped relation to the hole 104. A cover 106 with an integral lug 107 is provided on one end of the housing 101 over the hole 104. The lug 107 fits into a recess 108 in the top of the flange 103. The cover 106 is attached to the housing 101 by means of screws 109. An integral anvil or shoulder 110 is provided at the opposite end of the cap 106 in the housing 101. The housing 101 is fitted with a cap 111 which slides over the opening 112 at the end 113 of the shaft 102 for engaging the threads on the arrowhead 11. The cap 11 rotatably pivots on a pin 114 in order to engage and release the end 113 of the shaft 102 around the opening 112 as shown by the dotted lines in FIG. 6. A dimple 115 is provided on the cap 111 to snap into the opening 112 defining the threads 116 which screw onto the arrowhead 11.

FIGS. 8 to 11 illustrate the details of the construction of the shaft 102. The shaft 102, flange 103, recess 108 are integrally cast over the extension 117 of an insert 118. Spaced apart recesses 119 are provided on the extension 117 to provide locking of the insert 118 in the cast shaft 102.

The operation of the tool 100 is similar to that of the tool 10 of FIGS. 2 and 3, except that the cap 111 keeps the shaft 102 from moving in the housing in the field and making a noise. This locking means which is mounted on the tool 100 is preferred over the use of a holster for instance; however, other locking means can be used such as a movable screw can project into the hole 104 in th housing 101 (not shown) to lock the shaft 102 in position.

Preferably the tool is made of aluminum to reduce weigth, except for the insert 118 which is made of steel. Casting provides a rapid and easy method for making the parts of the tools 10 or 100. If necessary, the anvils 25 or 110 and/or the flange 14 or 103 where they are in hammering contact with each other can be reinforced with a steel insert (not shown). The insert 118 has threads which will tightly engage the threads on the arrowhead.

It is also preferred to have a shaft rotatable in the housing to provide ease of hand movement of the housing directly away from the arrowhead during arrowhead extraction. However, variations without rotation by engaging a portion of the housing with the sides of the shaft or the flange (not shown) such as shown in U.S. Pat. No. 2,572,370 to prevent rotational movement are operative. All of these variations will be obvious to those skilled in the art.

I claim:

1. The method for extracting an arrowhead which comprises:

a. removing an arrow shaft from a detachable type of arrowhead having sharp edges for hunting embedded in an object such that the head is exposed;

b. attaching a slide percussion tool with a linearly slidable housing mounted on a shaft with a percussion stop to the arrowhead;

c. repeatedly sliding the housing in a direction which approximates the direction of entry of the arrowhead into the object in order to remove the arrowhead from the object by hammering the housing against the stop; and d. inserting the arrowhead into the object where it was embedded in order to detach the arrowhead from the tool.

2. The method of claim 1 wherein the sliding housing is rotatable on the shaft which is round.

3. The method of claim 1 wherein the shaft is rotatable in the housing and is threaded onto the arrowhead by rotation of the shaft by hand onto mating threads on the arrowhead and then tightened by selectively locking the shaft to the housing.

4. The method of claim 1 wherein the arrowhead is embedded in wood while hunting.

5. The method of claim 1 wherein the arrowhead threads into the percussion tool.

* * * * *

UNITED STATES PATENT AND TRADEMARK OFFICE

CERTIFICATE OF CORRECTION

PATENT NO. : 4,043,020

DATED : 1977 August 23

INVENTOR(S) : Anthony J. Hoggard

It is certified that error appears in the above-identified patent and that said Letters Patent are hereby corrected as shown below:

Column 1, line 8, "slidable" should be --slideable--.

Column 1, line 50, insert --a-- after "of".

Column 2, line 68, "134" should be --14--.

Column 3, line 48, after "the" (second occurence), insert --hole 104 from the --.

Column 3, line 52 "cap 11" should be --cap 111--.

Column 4, line 11, "th" should be --the--.

Column 4, line 14 "weigth" should be --weight--.

Column 4, line 39 (Claim 1) "slidable" should be --slideable--.

Signed and Sealed this

*Twenty-seventh* Day of *December 1977*

[SEAL]

*Attest:*

RUTH C. MASON
*Attesting Officer*

LUTRELLE F. PARKER
*Acting Commissioner of Patents and Trademarks*